United States Patent [19]

Kawano et al.

[11] Patent Number: 4,644,815
[45] Date of Patent: Feb. 24, 1987

[54] LUBRICATION DEVICE IN TRANSMISSIONS

[75] Inventors: Ken Kawano, Nagoya; Takuo Sibata, Okazaki; Kouiti Kouketu, Toyota, all of Japan

[73] Assignee: Toyota Jidosha Kabushiki Kaisha, Aichi, Japan

[21] Appl. No.: 492,562

[22] Filed: May 9, 1983

[30] Foreign Application Priority Data

May 21, 1982 [JP] Japan .................................. 57-75181

[51] Int. Cl.[4] ......................... F16H 57/04; F01M 9/10
[52] U.S. Cl. ...................................... 74/467; 184/6.12
[58] Field of Search ........................... 74/467; 184/6.12

[56] References Cited

U.S. PATENT DOCUMENTS

| | | | |
|---|---|---|---|
| 1,473,092 | 11/1923 | Gunn | 74/467 |
| 1,680,328 | 8/1928 | Eicher | 74/467 |
| 2,051,886 | 8/1936 | Neuland | 184/6.12 |
| 3,259,210 | 7/1966 | Beebe et al. | 184/6.12 |
| 3,378,104 | 4/1968 | Venable | 184/6.12 |
| 3,637,049 | 1/1972 | Buttefield et al. | 184/6.12 |
| 3,785,458 | 1/1974 | Caldwell et al. | 184/6.12 |
| 4,222,283 | 9/1980 | Nagy | 74/467 |
| 4,442,729 | 4/1984 | Hayakawa | 74/467 |
| 4,480,493 | 11/1984 | Takahashi | 74/467 |

FOREIGN PATENT DOCUMENTS

| | | |
|---|---|---|
| 152067 | 6/1974 | Japan . |
| 37786 | 6/1974 | Japan . |
| 2041117 | 9/1980 | United Kingdom .................. 74/467 |

Primary Examiner—Lawrence Staab
Attorney, Agent, or Firm—Parkhurst & Oliff

[57] ABSTRACT

A lubrication device in a transmission in which change-speed gears rotatable on a hollow shaft are arranged to be supplied with lubricating oil through an axial blind bore in the shaft. The lubrication device includes an oil collector mounted in a casing assembly for the transmission and located above an open end of the axial blind bore in the shaft to receive lubricating oil picked up in the casing assembly, an oil feed pipe extending from the collector into the open end portion of the bore, and a pump impeller assembly mounted in the open end portion of the bore to impel the lubricating oil from the feed pipe toward the closed end of the bore during rotation of the hollow shaft.

4 Claims, 5 Drawing Figures

4,644,815

LUBRICATION DEVICE IN TRANSMISSIONS

BACKGROUND OF THE INVENTION

The present invention relates to a lubrication device in a transmission in which change-speed gears rotatable on an input or output hollow shaft are arranged to be supplied with lubricating oil through an axial blind bore in the shaft.

As one of such lubrication devices as described above, there has been proposed a lubrication device which comprises an oil collector mounted in a casing assembly for the transmission and located above an open end of the axial blind bore in the shaft to receive lubricating oil picked up in the casing assembly, an oil feed pipe extending from the collector into the open end portion of the blind bore to supply the lubricating oil from the collector into the blind bore. In such lubrication arrangement, a sleeve member with a cylindrical bore is fixed in place in the open end portion of the blind bore to retain an annular body of oil in the bore during rotation of the shaft. It has, however, been experienced that if an annular clearance between the sleeve member and the oil feed pipe is formed large in diameter to avoid interference between them, a leakage quantity of oil from the blind bore will increase. In the case that the annular clearance is formed small in diameter to reduce the leakage quantity of oil without any interference, both the sleeve member and the oil feed pipe must be manufactured and assembled with high accuracy.

SUMMARY OF THE INVENTION

It is, therefore, a primary object of the present invention to provide an improved lubrication device which is capable of reducing the leakage quantity of oil from the axial blind bore in the shaft with an appropriate annular clearance between the open end portion of the bore and the oil feed pipe.

According to the present invention there is provided a transmission including a casing assembly in which an amount of lubricating oil is stored, a hollow shaft rotatably mounted in the casing assembly and having a central axial blind bore the open end of which is exposed to the interior of the casing assembly and a radial oil port in open communication with the axial blind bore, and a rotary member such as a change-speed gear rotatably mounted by a bearing on the shaft, the oil port being arranged to supply the lubricating oil to the bearing through the axial blind bore, wherein a lubrication device comprises an oil collector mounted in the casing assembly and located above the open end of the blind bore in the hollow shaft to receive the lubricating oil picked up in the casing assembly, an oil feed pipe extending from the oil collector into the open end portion of the axial blind bore to supply the lubricating oil from the collector into the blind bore, and means for impelling the flow of lubricating oil from the feed pipe toward the closed end of the bore during rotation of the hollow shaft.

In the actual practices of the present invention, it is preferable that the impelling means is in the form of a pump impeller assembly mounted in the open end portion of the axial blind bore in the shaft. It is also noted that the pump impeller assembly may be replaced with a screw formed in the open end portion of the axial blind bore and surrounding a portion of the feed pipe located in the open end portion of the bore with an annular clearance to impel the lubricating oil from the feed pipe toward the closed end of the blind bore during rotation of the hollow shaft.

BRIEF DESCRIPTION OF THE DRAWINGS

These and additional features of the present invention will be more apparent from the following detailed description of preferred embodiments thereof when taken together with the accompanying drawings, in which.

DETAILED DESCRIPTION OF THE PREFERRED EMBODIMENTS

Figure 1:
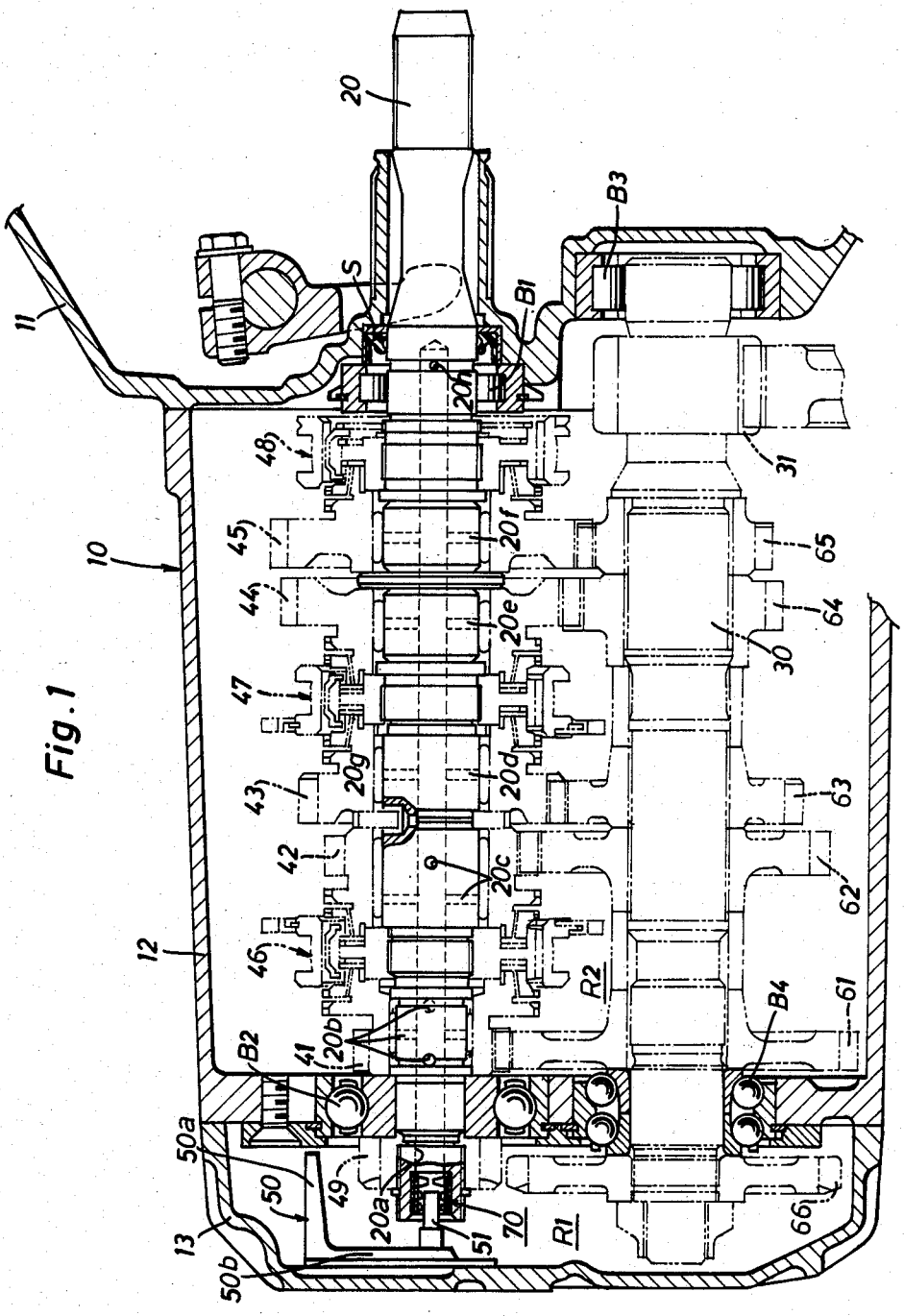
FIG. 1 is a partial sectional view of an automobile transmission in which an improved lubrication device is applied.

In FIG. 1 of the drawings there is illustrated an automobile transmission in which the present invention is applied. A casing assembly 10 for the transmission in which an amount of lubricating oil is stored includes a transmission casing 12 secured in a fluid-tight manner at its right end face to a trans-axle casing 11 and at its left end face to a cover member 13. Assembled in parallel within the casing assembly 10 are input and output shafts 20 and 30 which are respectively supported by a pair of axially spaced bearings $B_1$ and $B_2$ and by a pair of axially spaced bearings $B_3$ and $B_4$ from casings 11 and 12. A change-speed gearing in the transmission includes 1st to 5th speed drive gears 41-45 rotatably mounted by respective bearings on an intermediate portion of input shaft 20, 1st to 3rd synchromesh devices 46-48 fixedly mounted on the intermediate portion of input shaft 20, and a reverse drive gear 49 fixedly mounted on the left end of input shaft 20. The 1st and 2nd synchomesh devices 46, 47 are respectively located between the 1st and 2nd drive gears 41, 42 and between the 3rd and 4th drive gears 43, 44, and the 3rd synchromesh device 48 is arranged to connect the 5th drive gear to input shaft 20.

The output shaft 30 is provided thereon with 1st to 5th speed driven gears 61-65 which are permanently in mesh with the 1st to 5th speed drive gears 41-45. The output shaft 30 is further integrally provided thereon with a drive pinion 31 drivingly connected with a final drive gearing (not shown), and a reverse driven gear 66 is fixedly mounted on the left end of output shaft 30. A chamber $R_1$ formed by transmission casing 12 and cover member 13 communicates at its lower portion into a chamber $R_2$ formed by casings 11 and 12 through an axial through hole (not shown) in the left end wall of casing 12 to allow the flow of lubricating oil between chambers $R_1$ and $R_2$.

In such arrangement as described above, the input shaft 20 is in the form of a hollow shaft having a central axial blind bore 20a the open end of which is exposed to the interior of chamber $R_1$ and having radial oil ports 20b-20f which open at their inner ends into blind bore 20a and at their outer ends toward the bearings for drive gears 41-45. The hollow input shaft 20 is further provided with a radial oil port 20g for feed of the lubricating oil toward thrust surfaces of both drive gears 42, 43 and provided with a radial oil port 20h for feed of the lubricating oil toward an oil seal member S through bearing $B_1$. Assembled within the cover member 13 is an oil collector 50 which is arranged above the open end of input shaft 20 and secured to the inner wall of cover member 13 to receive the lubricating oil picked up by gears 49, 66 in chamber R₁ and to feed it into the axial blind bore 20a in input shaft 20. The oil collector 50 has an axial trough portion 50a and a pocket portion 50b to which an oil feed pipe 51 is connected. The oil feed pipe 51 extends into the open end portion of axial blind bore 20a to supply the lubricating oil from the pocket portion 50b of oil collector 50 into bore 20a. The lubricating oil in bore 20a flows through radial oil ports 20b–20h for lubrication of the respective bearings for drive gears 41–45, the thrust surfaces of both gears 42, 43, and the oil seal member S.

Figure 2:
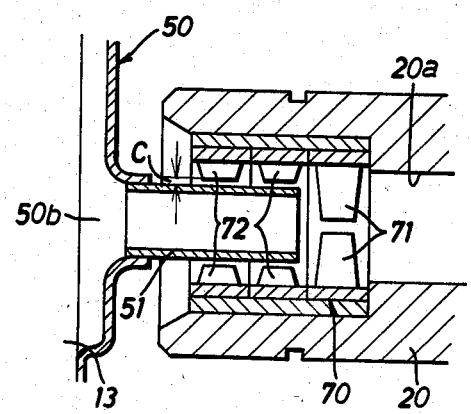
FIG. 2 is an enlarged sectional view of the lubrication device shown in FIG. 1.
Figure 3:
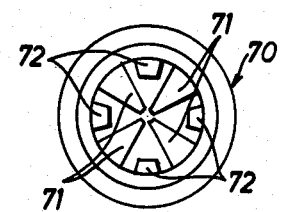
FIG. 3 is a front view of a pump impeller assembly shown in FIG. 2.

In this embodiment, it is to be noted that as can be well seen in FIG. 2, a pump impeller assembly 70 is mounted within the open end portion of bore 20a. The pump impeller assembly 70 rotates together with input shaft 20 to impel the lubricating oil from pipe 51 toward the closed end of bore 20a. The pump impeller assembly 70 further includes a first sleeve member formed therein with four equiangularly spaced blades 71 and a pair of second sleeve members respectively formed therein with four equiangularly spaced blades 72. The length of each blade 71 is longer than that of each blade 72 and is arranged between the two blades 72. In operation of the transmission, the pump impeller assembly 70 impels the flow of lubricating oil from pipe 51 toward the closed end of bore 20a and acts to restrict the reverse flow of lubricating oil toward the open end of bore 20a. For this reason, a leakage quantity of lubricating oil from bore 20a can be reduced in spite of provision of an appropriate annular clearance C between the outer periphery of pipe 51 and the inner end of each blade 72.

Figure 4:
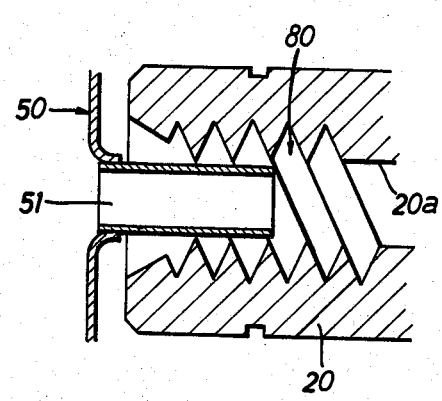
FIGS. 4 and 5 illustrate modifications of the lubrication device shown in FIG. 1.
Figure 5:
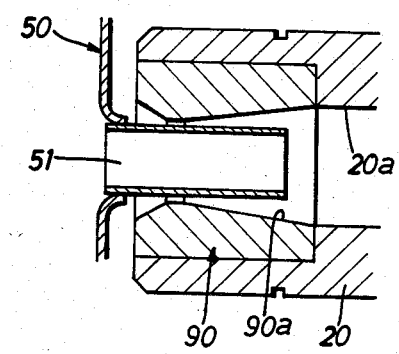

In a modification of the above embodiment illustrated in FIG. 4, the pump impeller assembly 70 is replaced with an impeller screw 80 formed in the open end portion of input shaft 20 and surrounding a portion of the oil feed pipe 51 located in the open end portion of bore 20a with an appropriate annular clearance. The impeller screw 80 in input shaft 20 acts to impel the flow of lubricating oil from pipe 51 toward the closed end of bore 20a and to prevent leakage of the lubricating oil from the open end of input shaft 20. In FIG. 5 there is illustrated another modification of the above embodiment in which the pump impeller assembly 70 is replaced with a sleeve-like bush 90 fixed in the open end portion of bore 20a and surrounding a portion of feed pipe 51 located in bore 20a with an appropriate annular clearance. The sleeve-like bush 90 is formed therein with a tapered aperture 90a concentric with and smaller in diameter at its outer end than the axial blind bore 20a.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A transmission lubrication device comprising:
a casing assembly in which an amount of lubricating oil is stored, a hollow shaft rotatably mounted in said casing assembly and having a central axial blind bore including an open end and a closed end, said open end being exposed to an interior of said casing assembly and a plurality of axially spaced radial oil ports in open communication with said axial blind bore, and a plurality of axially spaced change-speed gears rotatably mounted by means of a plurality of axially spaced bearings on said shaft, said oil ports being arranged to supply therethrough the lubricating oil to said bearings from said axial blind bore;
an oil collector mounted in said casing assembly and located above the open end of said axial blind bore to receive lubricating oil picked in said casing assembly;
an oil feed pipe extending from said oil collector and having an outlet located within the open end portion of said axial blind bore to supply the lubricating oil from said oil collector into said axial blind bore; and
impeller means arranged within the open end portion of said axial blind bore and surrounding the outlet of said feed pipe with an annular clearance, said impeller means cooperating with the outer periphery of said feed pipe for impelling the flow of lubricating oil in an axial direction of said impeller means from the said feed pipe toward the closed end of said axial blind bore during rotation of said hollow shaft, said impeller means being in the form of a pump impeller assembly, said pump impeller assembly comprising a sleeve member integrally formed therein with a plurality of equiangularly spaced blades in surrounding relationship with an outer portion of said feed pipe, an annular clearance being defined between said blades and said feed pipe, said impeller means being coupled in place within the open end portion of said axial blind bore.

2. A transmission lubrication device comprising:
a casing assembly in which an amount of lubricating oil is stored, a hollow shaft rotatably mounted in said casing assembly and having a central axial blind bore including an open end and a closed end, said open end being exposed to an interior of said casing assembly and a plurality of axially spaced radial oil ports in open communication with said axial blind bore, and a plurality of axially spaced change-speed gears rotatably mounted by means of a plurality of axially spaced bearings on said shaft, said oil ports being arranged to supply therethrough the lubricating oil to said bearings from said axial blind bore;
an oil collector mounted in said casing assembly and located above the open end of said axial boind bore to receive lubricating oil picked up in said casing assembly;
an oil feed pipe extending from said oil collector and having an outlet located within the open end portion of said axial blind bore to supply the lubricating oil from said oil collector into said axial blind bore; and
impeller means arranged within the open end portion of said axial blind bore and surrounding said outlet of said feed pipe with an annular clearance, said impeller means cooperating with the outer periphery of said feed pipe for impelling the flow of lubricating oil in an axial direction of said impeller means from said feed pipe toward the closed end of said axial blind bore during rotation of said hollow shaft, said impeller means comprising a sleeve-like bushing being formed with a tapered aperture concentric with and smaller in diameter than said axial blind bore and surrounding said outlet of said feed pipe, said tapered aperture increasing in diameter toward said closed end of said axial blind bore.

3. A transmission lubrication device comprising:

a casing assembly in which an amount of lubricating oil is stored, a hollow shaft rotatably mounted in said casing assembly and having a central axial blind bore including an open end and a closed end, said open end being exposed to an interior of said casing assembly and a plurality of axially spaced radial oil ports in open communication with said axial blind bore, and a plurality of axially spaced changed-speed gears rotatably mounted by means of a plurality of axially spaced bearings on said shaft, said oil ports being arranged to supply therethrough the lubricating oil to said bearings from said axial blind bore;

an oil collector mounted in said casing assembly and located above the open end of said axial blind bore to receive lubricating oil picked up in said casing assembly;

an oil feed pipe extending from said oil collector and having an outlet located within the open end portion of said axial blind bore to supply the lubricating oil from said oil collector into said axial blind bore; and impeller means arranged within the open end portion of said axial blind bore and surrounding said outlet of said feed pipe with an annular clearance, said impeller means cooperating with the outer periphery of said feed pipe for impelling the flow of lubricating oil in an axial direction of said impeller means from said feed pipe toward the closed end of said axial blind bore during rotation of said hollow shaft, said impeller means comprising a plurality of equiangularly spaced blades surrounding the outlet of said feed pipe.

4. A transmission lubrication device comprising:

a casing assembly in which an amount of lubrication oil is stored, a hollow shaft rotatably mounted in said casing assembly and having a central axial blind bore including an open end and a closed end, said open end being exposed to an interior of said casing assembly and a plurality of axially spaced radial oil ports in open communication with said axial blind bore, and a plurality of axially spaced change-speed gears rotatably mounted by means of a plurality of axially spaced bearings on said shaft, said oil ports being arranged to supply therethrough the lubricating oil to said bearings from said axial blind bore;

an oil collector mounted in said casing assembly and located above the open end of said axial blind bore to receive lubricating oil picked in said casing assembly;

an oil feed pipe extending from said oil collector and having an outlet located within said open end portion of said axial blind bore to supply the lubricating oil from said oil collector into said axial blind bore; and impeller means arranged within the open end portion of said axial blind bore and surrounding the outlet of said feed pipe with an annular clearance, said impeller means cooperating with the outer periphery of said feed pipe for impelling the flow of lubricating oil in an axial direction of said impeller means from the said feed pipe toward the closed end of said axial blind bore during rotation of said hollow shaft, said impeller means being in the form of a sleeve-like bush fixed in said open end portion of said axial blind bore in surrounding relationship with a portion of said feed pipe with an angular clearance being defined therebetween, said sleeve-like bush being formed therein with a tapered aperture concontric with and smaller in diameter at its outer end than said axial blind bore, said tapered aperture increasing in diameter toward the closed end of said central axial blind bore.

* * * * *